US012714282B2

(12) United States Patent
Su

(10) Patent No.: US 12,714,282 B2
(45) Date of Patent: Aug. 25, 2026

(54) SCRAPER TOOL WITH QUICK BLADE CHANGE MECHANISM

(71) Applicant: HONG ANN TOOL INDUSTRIES CO., LTD., Taichung City (TW)

(72) Inventor: Cheng-Wei Su, Taichung City (TW)

(73) Assignee: HONG ANN TOOL INDUSTRIES CO., LTD., Taichung City (TW)

( * ) Notice: Subject to any disclaimer, the term of this patent is extended or adjusted under 35 U.S.C. 154(b) by 507 days.

(21) Appl. No.: 18/359,005

(22) Filed: Jul. 26, 2023

(65) Prior Publication Data

US 2025/0031937 A1 Jan. 30, 2025

(51) Int. Cl.

| | |
|---|---|
| ***A47L 13/08*** | (2006.01) |
| ***A47L 13/022*** | (2006.01) |
| *B26B 5/00* | (2006.01) |
| *B44D 3/16* | (2006.01) |

(52) U.S. Cl.

CPC ............. *A47L 13/08* (2013.01); *A47L 13/022* (2013.01); *B26B 5/006* (2013.01); *B44D 3/164* (2013.01)

(58) Field of Classification Search

CPC ....... B44D 3/164; B26B 5/006; A47L 13/022; A47L 13/08

USPC ........................................................ 15/236.01

See application file for complete search history.

(56) References Cited

U.S. PATENT DOCUMENTS

| | | | | |
|---|---|---|---|---|
| 7,647,702 B2 * | 1/2010 | Polei | ........................ | B26B 5/003 30/162 |
| 8,291,598 B2 * | 10/2012 | Corron | .................. | A47L 13/022 30/162 |
| 8,356,415 B2 | 1/2013 | Lin | | |
| 2019/0134831 A1 * | 5/2019 | Chiu | ........................ | A47L 13/08 |

* cited by examiner

*Primary Examiner* — Katina N. Henson

(74) *Attorney, Agent, or Firm* — MUNCY, GEISSLER, OLDS & LOWE, P.C.

(57) ABSTRACT

A scraper tool includes a first and second clamping part, a tightening mechanism, and a locking mechanism. The tightening mechanism is movably connected to the first and the second clamping parts and movable to a tightening position in which the first and the second clamping parts are close to one another and an untightening position in which the first and the second clamping parts are apart from one another. The locking mechanism including a locking member selectively restraining the tightening mechanism movably connected to the first clamping part.

15 Claims, 12 Drawing Sheets

SCRAPER TOOL WITH QUICK BLADE CHANGE MECHANISM

BACKGROUND OF THE INVENTION

The present invention relates to a scraper tool and, more particularly, to a scraper tool with quick blade change mechanism.

U.S. Pat. No. 8,356,415 B2, entitled a scraping tool with a blade lock assembly, discloses a scraping tool designed to allow a quick assembly and replacement of a scraper blade. The scraping tool includes a handle and a scraping section at the front end thereof. The scraping section includes a jaw, an arm extending from the back of the jaw, and a fastener located inside a groove in the back of the scraping section. The arm can pivot about the fastener to swing back and forth. Further, there is provided a control button that allows a user to provide a vertical pushing force to the back of the jaw and creates a strong clamping force in the front of the jaw, thereby clamping the scraper blade. The control button is provided with a cam that can interact with the jaw and make it clamp the scraper blade. The control button is pressed downward in order to allow the scraper blade to be released from the jaw. However, the push bottom, when subject to an excessive force or vibrations after repeated operations, starts to become loosely mounted.

The present invention is, therefore, intended to obviate or at least alleviate the problems encountered in the prior art.

SUMMARY OF THE INVENTION

A scraper tool with quick blade change mechanism includes a first clamping part, a second clamping part, a tightening mechanism, and a locking mechanism. The first clamping part is provided with a first clamping portion and a first connecting portion and includes a first slot arranged between the first clamping and the first connecting portions. The second clamping part is provided with a second clamping portion and a second connecting portion and includes a second slot arranged between the second clamping and the second connecting portions. The second connecting portion is connected to the first connecting portion. The tightening mechanism is provided with a slidable portion slidably engaged in the first and the second slots to movably connect to the first and the second clamping parts. The tightening mechanism is movable to a tightening position in which the first and the second clamping parts are close to one another for tightly holding a blade therebetween and an untightening position in which the first and the second clamping parts are apart from one another for allowing the blade to be dissembled therefrom. The locking mechanism including a locking member selectively restraining the tightening mechanism movably connected to the first clamping part. The locking member is movable to a locking position and an unlocking position. When the tightening mechanism is in the tightening position and the locking member is in the locking position, the locking member is unmoved and the tightening mechanism is restrained by the locking member to keep in the tightening position. When the locking member is in the unlocking position, the tightening mechanism is movable to the tightening and untightening positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
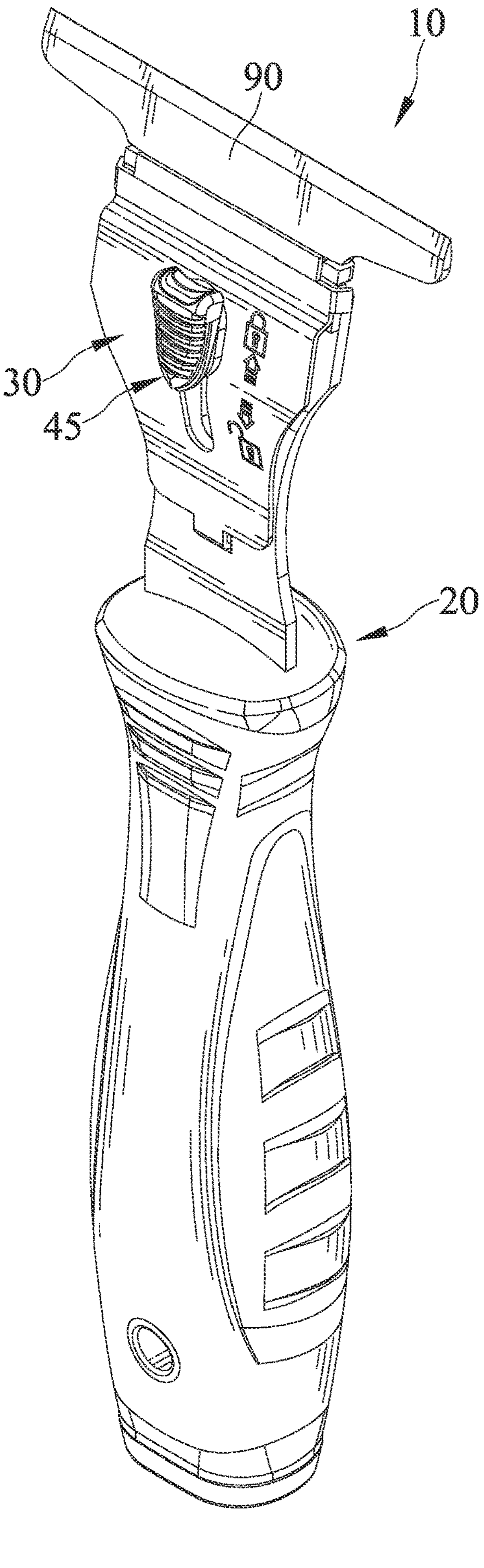
FIG. 1 is a perspective view of a scraper tool with quick blade change mechanism according to a first embodiment of the present invention.
Figure 2:
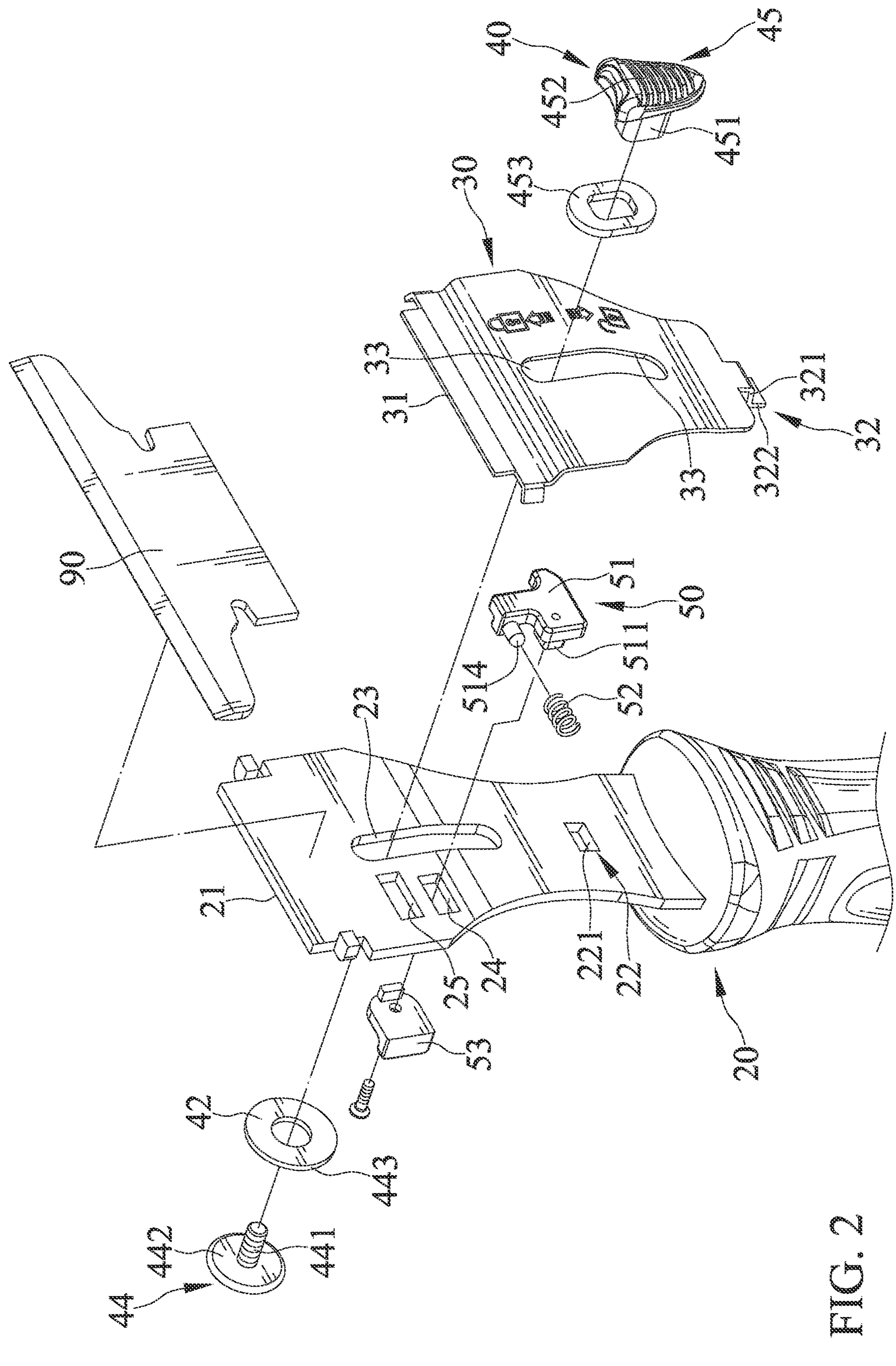
FIG. 2 is an exploded perspective view of the scraper tool of FIG. 1.
Figure 3:
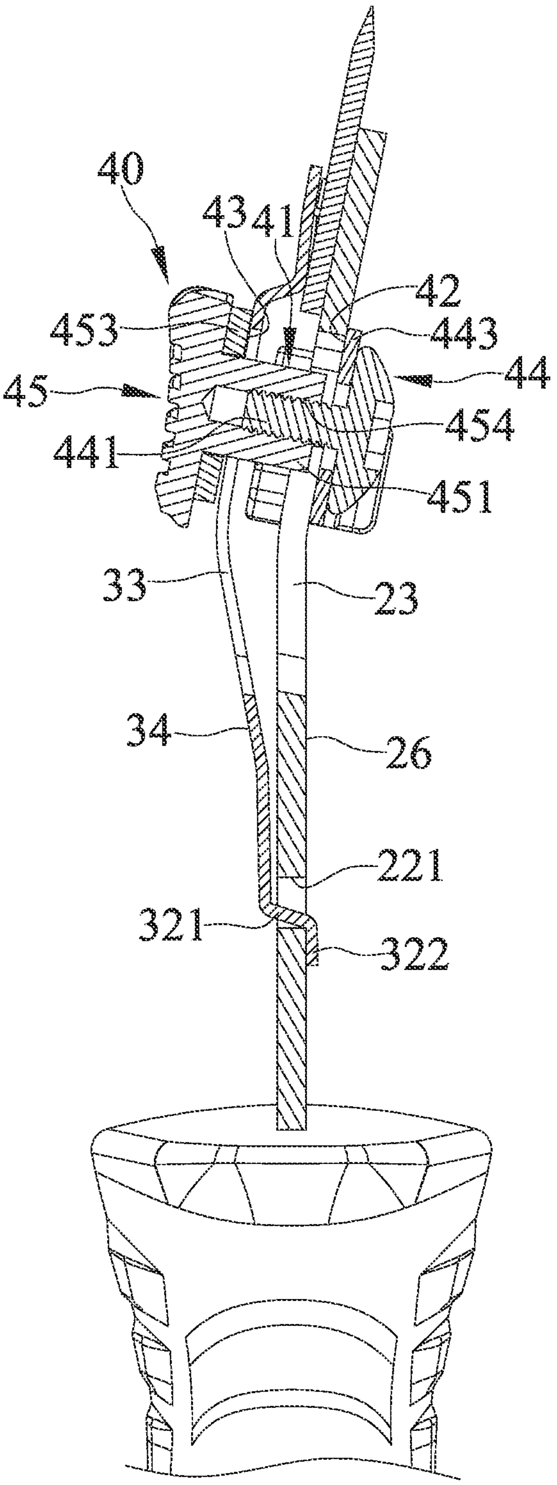
FIG. 3 is a cross-sectional view of the scraper tool of FIG. 1.
Figure 4:
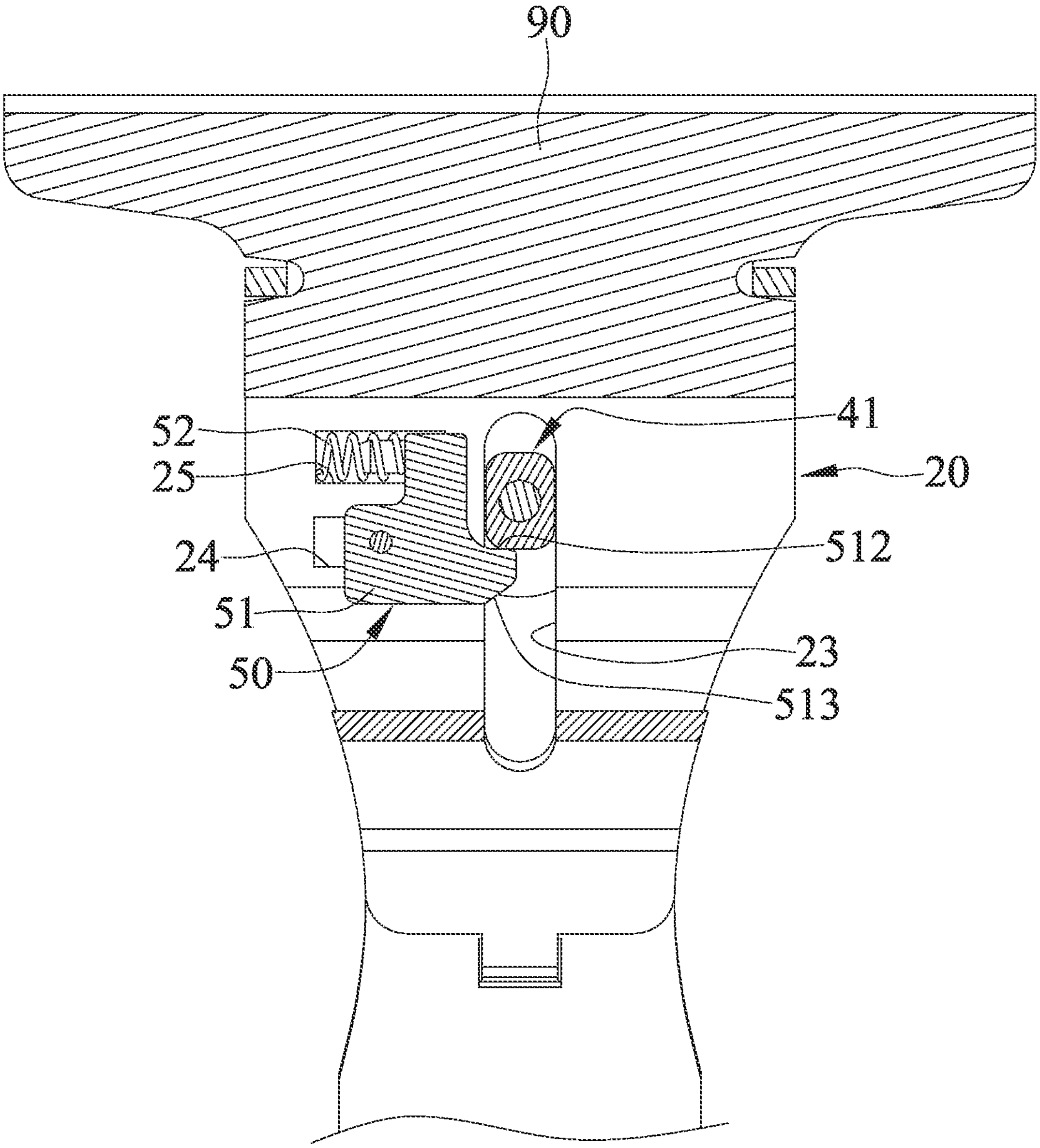
FIG. 4 is another cross-sectional view of the scraper tool of FIG. 1 and shows it includes a tightening mechanism and a locking mechanism restraining the tightening mechanism from moving to its untightening position.
Figure 5:
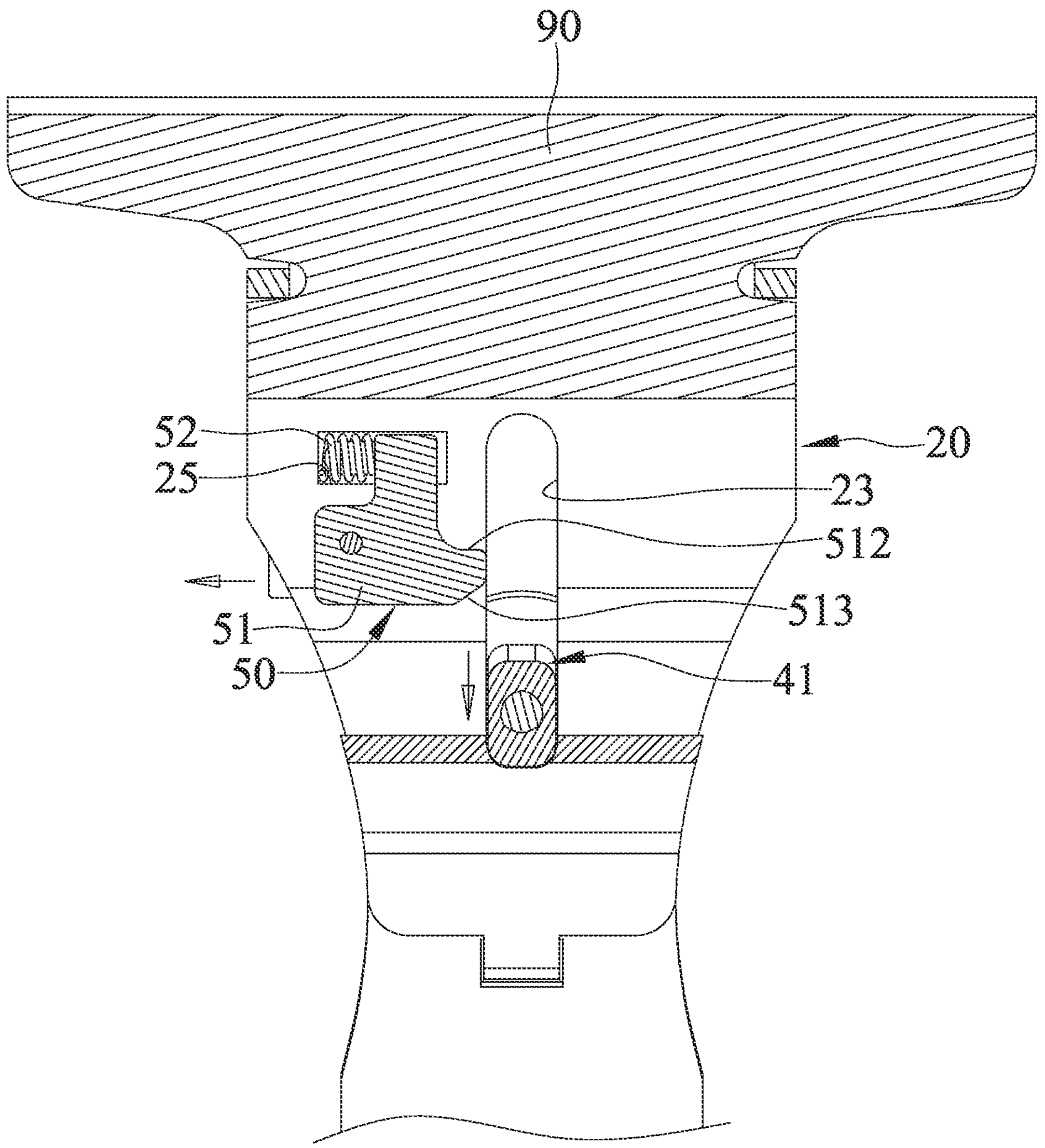
FIG. 5 is another cross-sectional view of the scraper tool of FIG. 1 and shows it includes the tightening and locking mechanisms being movable as well as the locking mechanism moved to its unlocking position and the tightening mechanism unrestrained from the locking mechanism and moved to its untightening position.
Figure 6:
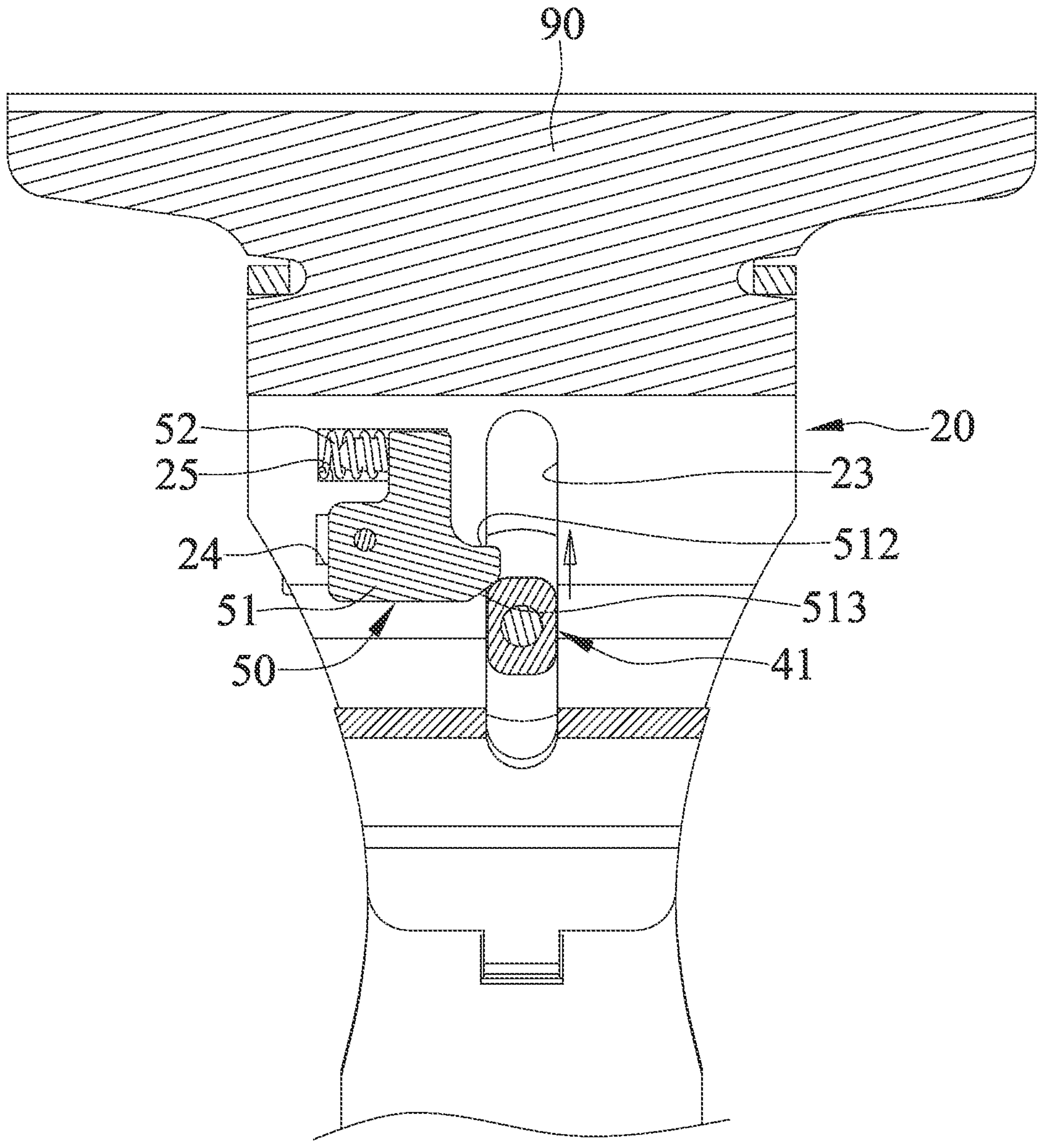
FIG. 6 is another cross-sectional view of the scraper tool of FIG. 1 and shows it includes tightening mechanism being moveable to its tightening position.

FIGS. 1-6 show a scraper tool with quick blade change mechanism according to a first embodiment of the present invention. The scraper tool 10 includes a first clamping part 20, a second clamping part 30, a tightening mechanism 40, and a locking mechanism 50.

The first clamping part 20 is provided with a first clamping portion 21 and a first connecting portion 22 and includes a first slot 23 arranged between the first clamping 21 and the first connecting 22 portions. The first slot 23 is provided with one end adjacent to the first clamping portion 21 and another end adjacent to the first connecting portion 22.

The second clamping part 30 is provided with a second clamping portion 31 and a second connecting portion 32 and includes a second slot 33 arranged between the second clamping 31 and the second connecting 32 portions. The second connecting portion 32 is connected to the first connecting portion 22. The second slot 33 is provided with one end adjacent to the second clamping portion 31 and another end adjacent to the second connecting portion 32. The first clamping part 20 is provide with a first side adjacent to the second clamping part 30 and a second side opposite the first side. The first clamping part 20 defines a first surface 26 on the second side. The first connecting portion 22 defines a through hole 221 and the second connecting portion 32 is provided with a flexible portion 321 and a hooking portion 322. The flexible portion 321 is arranged in the through hole 221 and the hooking portion 322 passes through the through hole 221 and is hooked onto the first surface 26 upon connection of the first and the second connecting portions 22 and 32.

The tightening mechanism 40 is provided with a slidable portion 41 slidably engaged in the first and the second slots 23 and 33 to movably connect to the first and the second clamping parts 20 and 30. The second clamping part 30 is provided with a first side adjacent to and facing the first side of the clamping part 20 and a second side opposite the first side. The second clamping part 30 defines a second surface 34 on the second side. The tightening mechanism 40 includes the slidable portion 41 forming a slidable member 451. The tightening mechanism 40 includes a securing member 44 engaged with one end of the slidable member 451 configured for preventing the slidable member 451 disengaging from the first and the second slots 23 and 33 and a control handle 45 protruding from another end of the slidable member 451 configured for allow a user to control the tightening mechanism 40. The securing member 44 and the slidable member 451 are in thread engagement. The slidable member 451 includes internal threads 454 configured for engage with the securing member 44. The securing member 44 is provided with a fastening portion 441 engaged with the slidable member 451 and a pressing portion 442. The pressing portion 442 and the first surface 26 include a first gasket 443 disposed therebetween. An end of the control handle 45 and second surface 34 include a second gasket 453 disposed therebetween. The-first gasket 443 is provided with a first abutting portion 42 abutting against the first surface 26 and the second gasket 453 is provided with a second abutting portion 43 abutting against the second surface 34 respectively. The fastening portion 441 is inserted through the first gasket 443 and the first slot 23. The slidable member 451 is inserted through the second gasket 453 and the second slot 33. The control handle 45 is provided with an activating portion 452 on which a user's finger is adapted to press. The activating portion 452 is made to increase frictions with the user's finger by including ribs. Such structure that can increase frictions between the control handle 45 and the user's finger is not limited.

The tightening mechanism 40 is movable to a tightening position in which the first and the second clamping parts 20 and 30 are close to one another for tightly holding a blade 90 therebetween and an untightening position in which the first and the second clamping parts 20 and 30 are apart from one another for allowing the blade 90 to be dissembled therefrom. The tightening mechanism 40 moving between the tightening and the untightening positions is of a moving track extending along the first and the second slots 23 and 33.

The locking mechanism 50 includes a locking member 51 selectively restraining the tightening mechanism 40 movably connected to the first clamping part 20. The first clamping part 20 is provided with a chute 24 and the locking member 51 is provided with a connecting portion 511 movably engaged in the chute 24 to movably connect to the first clamping part 20. A longitudinal direction of the chute 24 is transverse to a longitudinal direction of either the first or the second slots 23 and 33.

The locking mechanism 50 also includes a control handle 53 connected to the connecting portion 511 of the locking member 51, configured for a user to control the locking member 51. The control handle 53 is mounted on the first clamping part 20 and arranged outside a space between the first and the second clamping parts 20 and 30.

The locking mechanism 50 further includes a biasing member 52 held between the locking member 51 and the first clamping part 20 biasing the locking member 51 to the locking position. The first clamping part 20 defines a receptacle 25 and one end of the biasing member 52 is arranged in the receptacle 25. The locking member 51 is provided with a mounting portion 514 and another end of the biasing member 52 capped on the mounting portion 514. The chute 24 and the receptacle 25 extend through the first clamping part 20 and connect the first and the second sides of the first clamping part 20. The locking member 51 is arranged between the first and the second clamping parts 20 and 30 and inserted into the first side of the first clamping part 20 which is adjacent to the second clamping part 30.

The locking member 51 is movable to a locking position and an unlocking position. The locking member 51 moving between the locking and the unlocking positions is of a moving track extending along the longitudinal direction of the chute 24. When the tightening mechanism 40 is in the tightening position and the locking member 51 is in the locking position, the locking member 51 is unmoved and the tightening mechanism 40 is restrained by the locking member 51 to keep in the tightening position. When the locking member 51 is in the unlocking position, the tightening mechanism 40 is movable to the tightening and untightening positions. Further, the locking member 51 is provided with a stopping portion 512 selectively stopping the tightening mechanism 40 facing the first clamping portion 21 and a guided portion 513 opposite the stopping portion 512. The stopping portion 512 extends in a direction transverse to the longitudinal direction of either the first or the second slots 23 and 33. The guided portion 513 is neither perpendicular nor parallel to the longitudinal direction of either the first or the second slots 23 and 33. The guided portion 513 forms an inclined surface When the locking member 51 is in the locking position and the tightening mechanism 40 is in the tightening position, the slidable portion 41 abuts against the stopping portion 512 to allow the tightening mechanism 40 to keep in the tightening position. When the tightening mechanism 40 is in transition from the untightening to the tightening positions, the slidable portion 41 is adapted to push the guided portion 513 to guide the locking member 51 toward its unlocking position.

Figure 7:
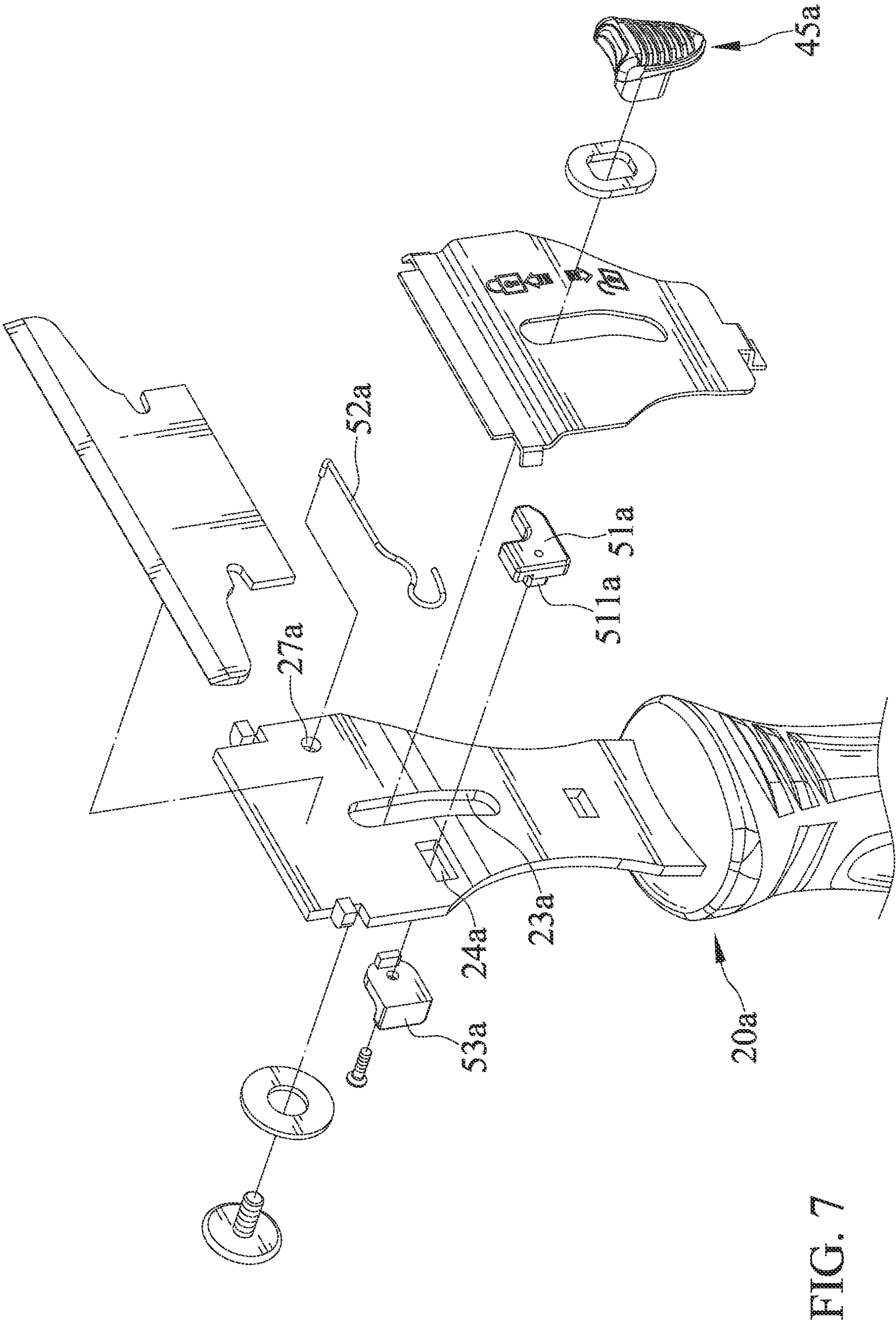
FIG. 7 is an exploded perspective view of a scraper tool with quick blade change mechanism according to a second embodiment of the present invention.
Figure 8:
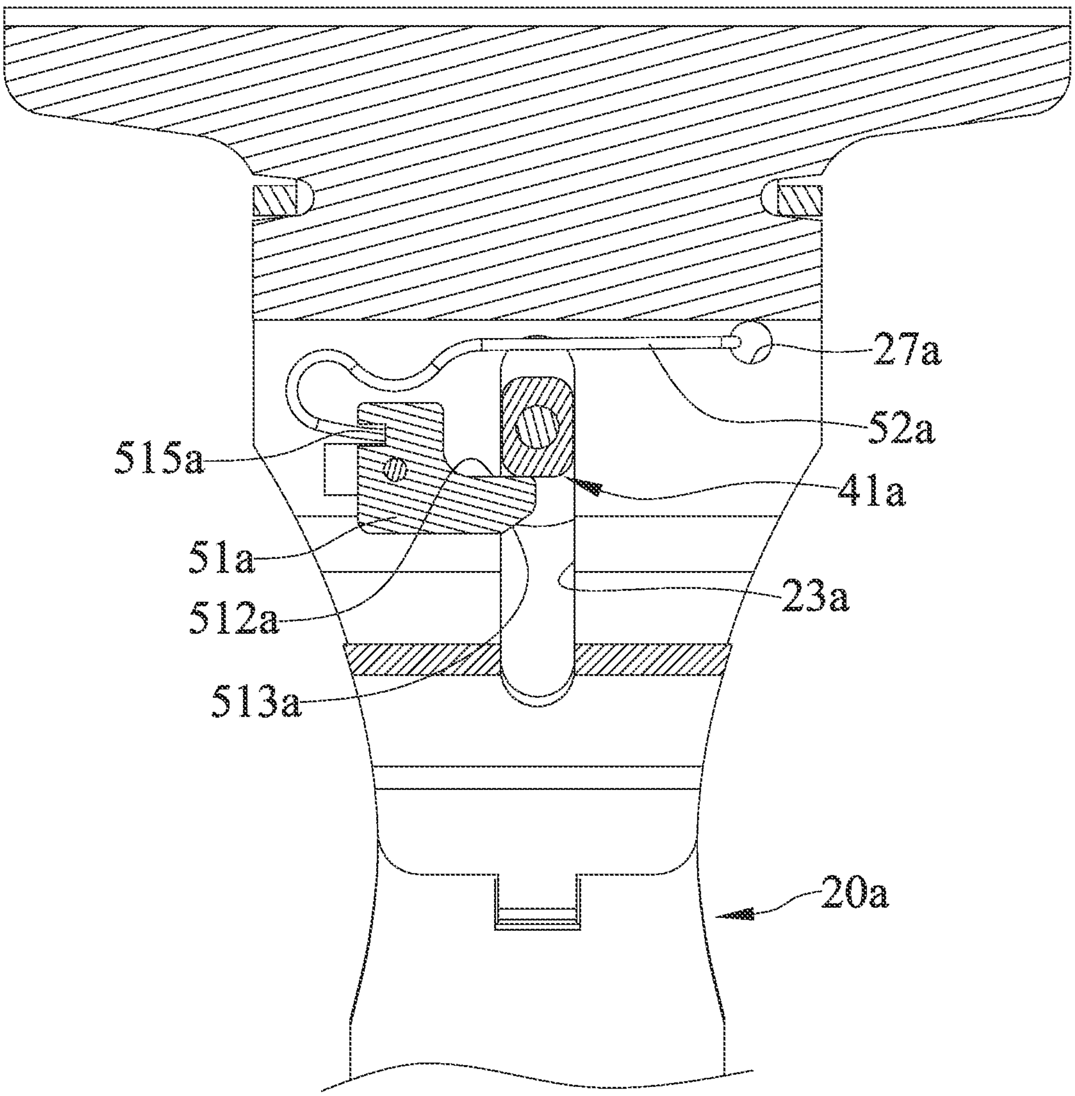
FIG. 8 is a cross-sectional view of the scraper tool of FIG. 7 and shows it includes a tightening mechanism and a locking mechanism restraining the tightening mechanism from moving to its untightening position.

FIGS. 7 and 8 show a tool section in accordance with a second embodiment of the present invention, and the same numbers are used to correlate similar components of the first embodiment, but bearing a letter a. As an initial matter, for brevity, many of the details discussed with reference to the previous FIGS. 1-6 may not be discussed or repeated hereafter. The second embodiment includes a first slot 23*a* arranged between the first clamping and the first connecting portions. A tightening mechanism is provided with a slidable portion 41*a* slidably engaged in the first slot 23 and the second slot. The slidable portion 41*a* forms a slidable member. A control handle 45*a* protrudes from the slidable member configured for allow a user to control the tightening mechanism. A locking mechanism including a locking member 51*a* selectively restraining the tightening mechanism. The first clamping part is provided with a chute and the locking member 51*a* is provided with a connecting portion 511*a* movably engaged in the chute. The locking mechanism also includes a biasing member 52*a* held between the locking member 51*a* and the first clamping part, and a control handle 53*a* connected to the connecting portion 511*a* of the locking member 51*a* configured for a user to control the locking member 51*a*. The locking member 51*a* is provided with a stopping portion 512*a* selectively stopping the tightening mechanism and a guided portion 513*a* opposite the stopping portion 512*a*. When the locking member 51*a* is in the locking position and the tightening mechanism is in the tightening position, the slidable portion 41*a* abuts against the stopping portion 512*a*. When the tightening mechanism is in transition from the untightening to the tightening positions, the slidable portion 41*a* is adapted to push the guided portion 513*a* to guide the locking member 51*a* toward its unlocking position.

The second embodiment is different from the first embodiment in that the first clamping part 20*a* defines a first hook hole 27*a* and the locking member 51*a* defines a second hook hole 515*a* respectively, and one end of the biasing member 52*a* is hooked in the first hook hole 27*a* while another end of the biasing member 52*a* is hooked in the second hook hole 515*a* respectively. The first hook hole 27*a* and the locking member 51*a* are arranged on opposite sides of the first slot 23*a*. The first and the second hook holes 27*a* and 515*a* are arranged on opposite sides of the first slot 23*a*.

Figure 9:
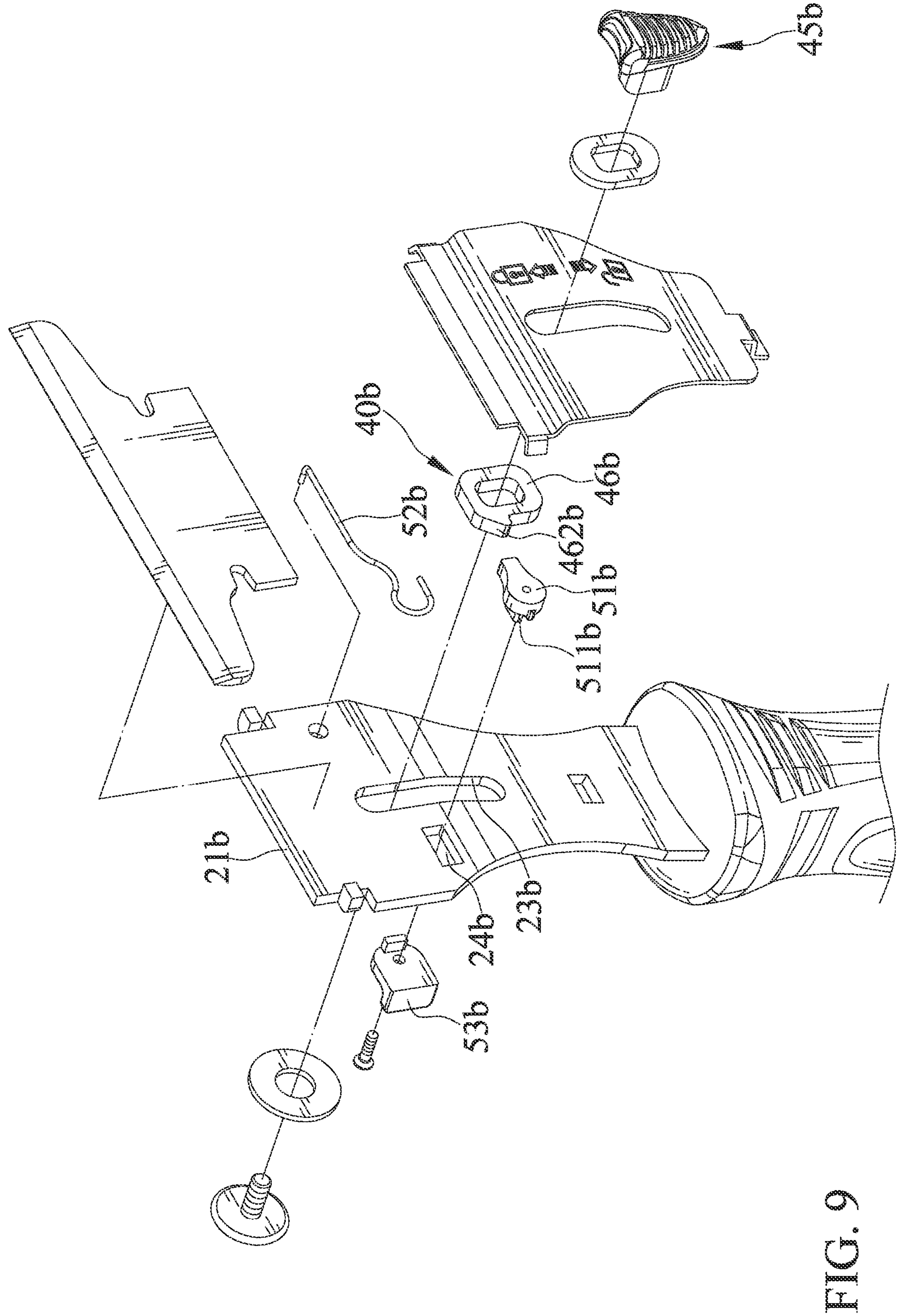
FIG. 9 is an exploded perspective view of a scraper tool with quick blade change mechanism according to a third embodiment of the present invention.
Figure 10:
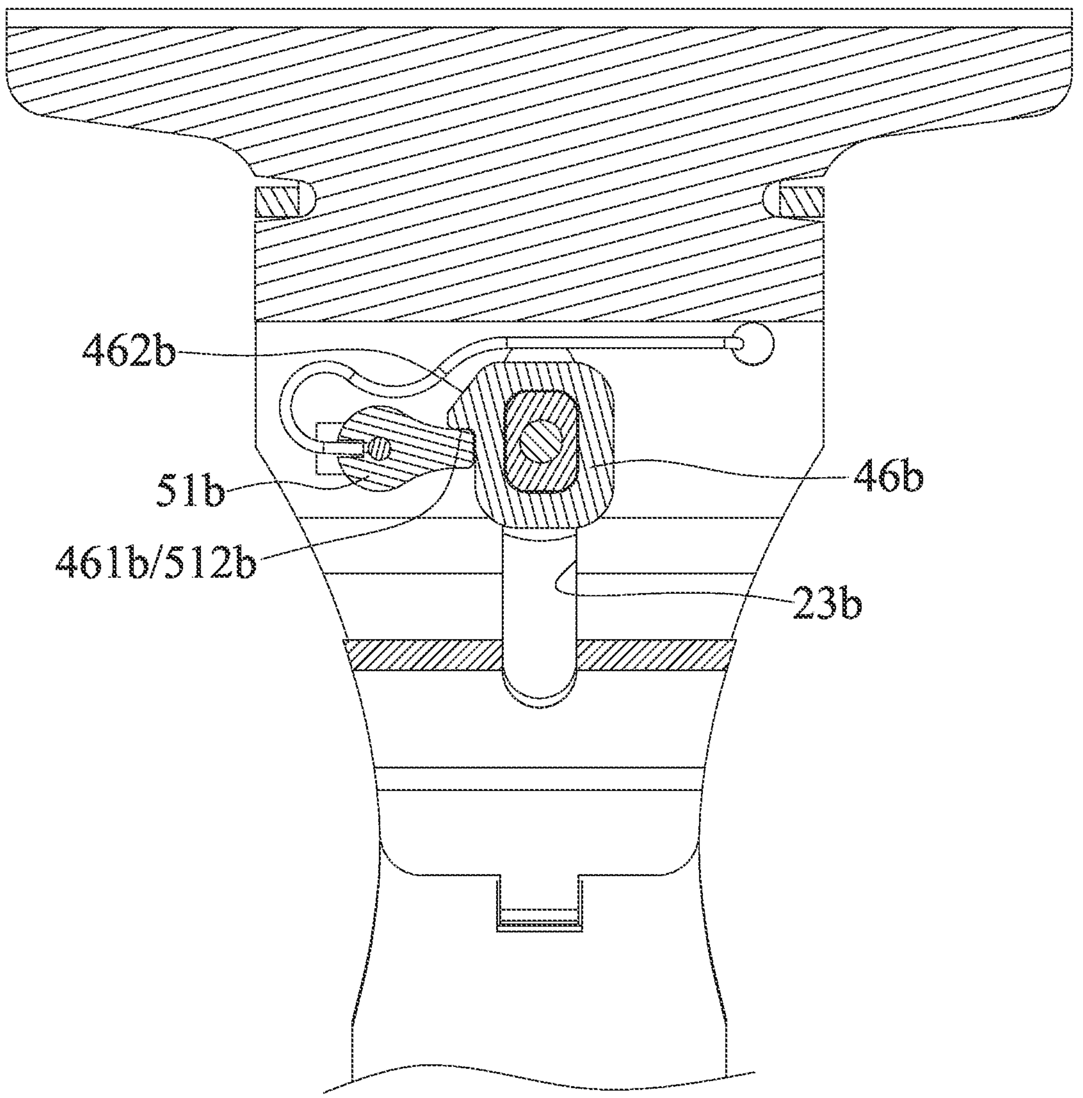
FIG. 10 is a cross-sectional view of the scraper tool of FIG. 9 and shows it includes a tightening mechanism and a locking mechanism restraining the tightening mechanism from moving to its untightening position.

FIGS. 9 and 10 show a tool section in accordance with a third embodiment of the present invention, and the same numbers are used to correlate similar components of the first embodiment, but bearing a letter b. As an initial matter, for brevity, many of the details discussed with reference to the previous FIGS. 1-6 may not be discussed or repeated hereafter. The third embodiment includes a first clamping portion 21*b* and a first connecting portion and includes a first slot 23*b* arranged between the first clamping 21*b* and the first connecting portions. A tightening mechanism 40*b* forms a slidable member and is movable to a tightening position for tightly holding the blade 90 and an untightening position for allowing the blade 90 to be dissembled therefrom. A control handle 45*b* protrudes from the slidable member configured for allow a user to control the tightening mechanism 40*b*. A locking mechanism including a locking member 51*b* selectively restraining the tightening mechanism 40*b*. The first clamping part is provided with a chute and the locking member 51*b* is provided with a connecting portion 511*b* movably engaged in the chute. The locking mechanism also includes a biasing member 52*b* held between the locking member 51*b* and the first clamping part, and a control handle 53*b* connected to the connecting portion 511*b* of the locking member 51*b* configured for a user to control the locking member 51*a*.

The third embodiment is different from the first embodiment in that the locking member 51*b* is provided with a stopping portion 512*b* selectively stopping the tightening mechanism facing the first clamping portion 21*b*. The tightening mechanism 40*b* includes a limit member 46*b* provided with a limiting portion 461*b* selectively contacting which the stopping portion 512*b* and a guided portion 462*b*. The limiting portion 461*b* and the stopping portion 512*b* face oppositely. The guided portion 462*b* forms an inclined surface. When the locking member 51) is in the locking position and the tightening mechanism is in the tightening position, the limiting portion 461*b* abuts against the stopping portion 512*b* to allow the tightening mechanism to keep in the tightening position. When the tightening mechanism is in transition from the untightening to the tightening positions, the guided portion 462*b* of the limit member 46*b* is adapted to push the locking member 51*b* toward its unlocking position. The limiting portion 461*b* extends in a direction transverse to the longitudinal direction of either the first slot 23*b* or the second slot. The guided portion 462*b* is neither perpendicular nor parallel to the longitudinal direction of either first slot 23*b* or the second slot. The first clamping part defines a first hook hole and the locking member 51*b* defines a second hook hole respectively, and one end of the biasing member is hooked in the first hook hole while another end of the biasing member is hooked in the second hook hole respectively. The first hook hole and the locking member 51*b* are arranged on opposite sides of the first slot 23*b*. The first and the second hook holes are arranged on opposite sides of the first slot 23*a*.

Figure 11:
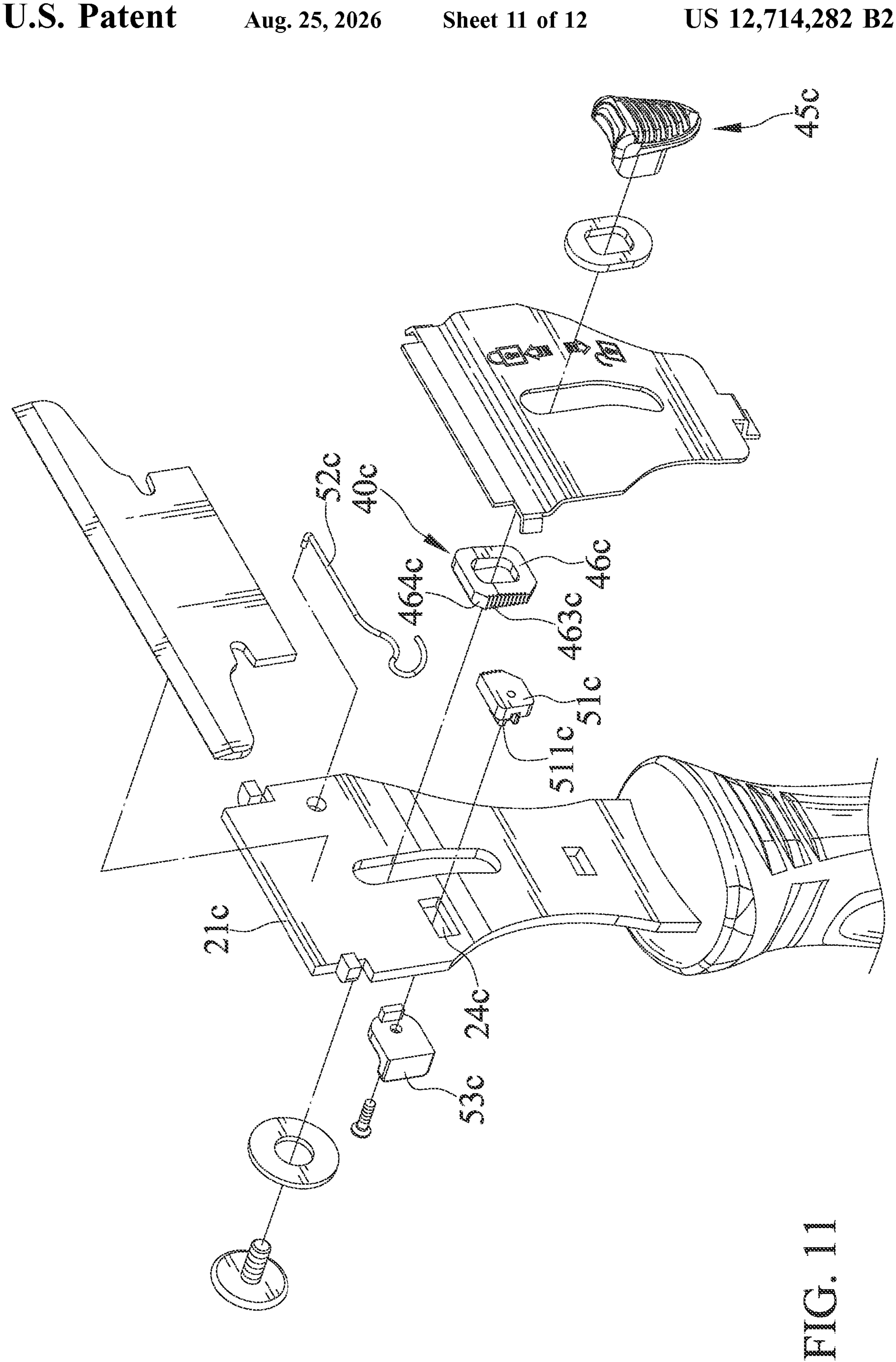
FIG. 11 is an exploded perspective view of a scraper tool with quick blade change mechanism according to a fourth embodiment of the present invention.
Figure 12:
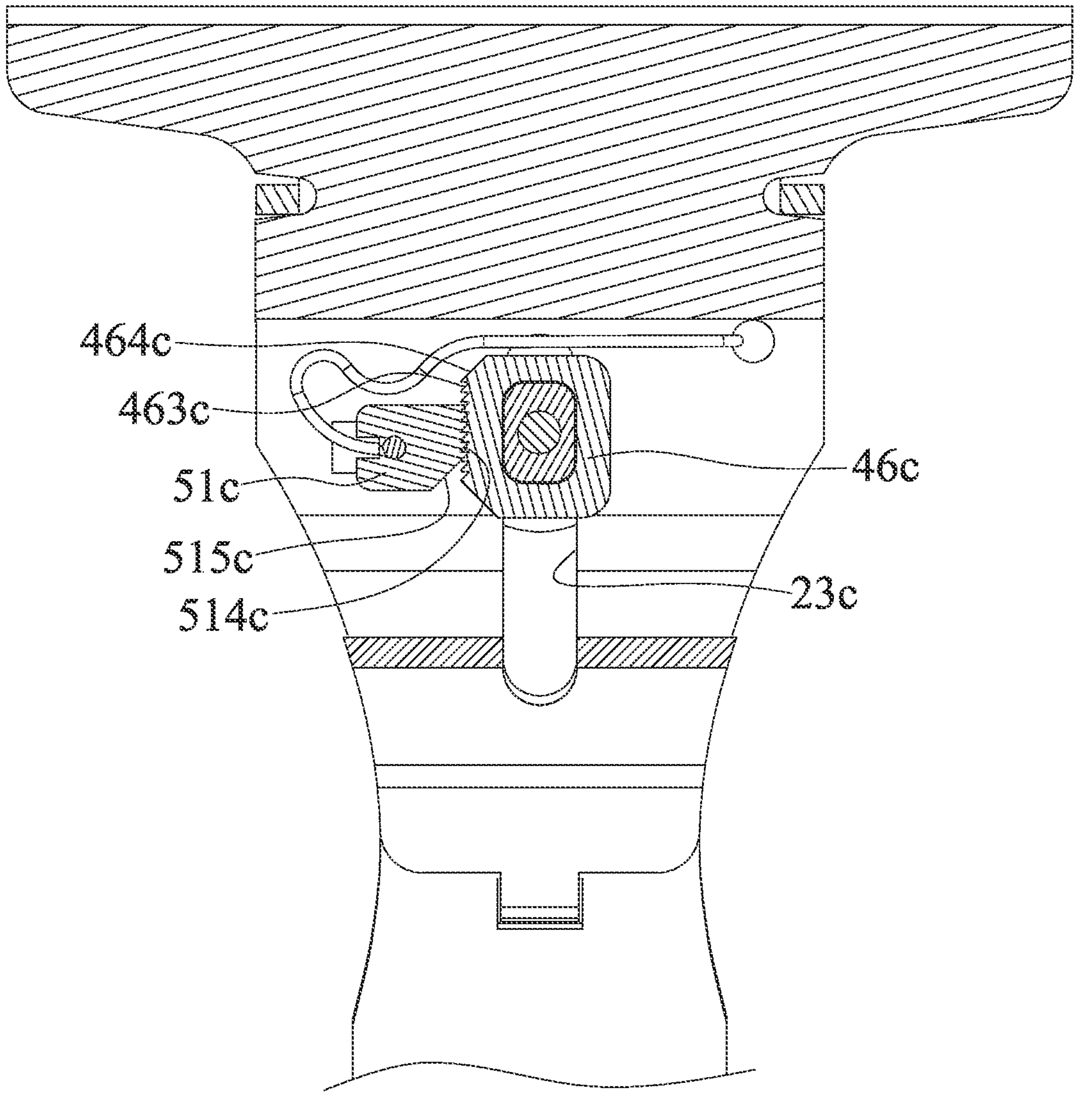
FIG. 12 is a cross-sectional view of the scraper tool of FIG. 11 and shows it includes a tightening mechanism and a locking mechanism restraining the tightening mechanism from moving to its untightening position.

FIGS. 11 and 12 show a tool section in accordance with a fourth embodiment of the present invention, and the same numbers are used to correlate similar components of the first embodiment, but bearing a letter c. As an initial matter, for brevity, many of the details discussed with reference to the previous FIGS. 1-6 may not be discussed or repeated hereafter. The fourth embodiment includes a first clamping portion 21*c* and a first connecting portion and includes a first slot 23*c* arranged between the first clamping 21*c* and the first connecting portions. A tightening mechanism 40*c* forms a slidable member and is movable to a tightening position for tightly holding the blade 90 and an untightening position for allowing the blade 90 to be dissembled therefrom. A control handle 45*b* protrudes from the slidable member configured for allow a user to control the tightening mechanism 40*c*. A locking mechanism including a locking member 51*c* selectively restraining the tightening mechanism 40*c*. The first clamping part is provided with a chute and the locking member 51*c* is provided with a connecting portion 511*c* movably engaged in the chute. The locking mechanism also includes a biasing member 52*c* held between the locking member 51*c* and the first clamping part, and a control handle 53*c* connected to the connecting portion 511*c* of the locking member 51*c* configured for a user to control the locking member 51*c*.

The fourth embodiment is different from the first embodiment in that the tightening mechanism includes a limit member 46*c* provided with a first retaining portion 463*c* and the locking member 51*c* is provided with a second retaining portion 514*c* selectively engaged with and disengaged from the first retaining portion 463*c*. The tightening mechanism is provided with a first guided portion 464*c* and the locking member 51*c* is provided with a second guided portion 515*c* selectively engaged with and disengaged from the first guided portion 464*c*. The first and the second guided portions (464*c*, 515*c*) forms an inclined surface. The first and the second retaining portion 463*c* and 514*c* are toothed. When the locking member 51*c* is in the locking position and the tightening mechanism is in the tightening position, the first and the second retaining portions 463*c* and 514*c* engage with each other to allow the tightening mechanism to keep in the tightening position. When the tightening mechanism is in transition from the untightening to the tightening positions, the first guided portion 464*c* is adapted to push the second guided portion 515*c* to guide the locking member 51*c* toward its unlocking position. Each of the first and the second retaining portions 463*c* and 514*c* includes at least one tooth. The at least one tooth extends in a direction transverse to the longitudinal direction of either first slot 23*c* or the second slot. Each of the first and the second guided portion 464*c* and 515*c* is neither perpendicular nor parallel to the longitudinal direction of either first slot 23*c* or the second slot. The first clamping part defines a first hook hole and the locking member 51*c* defines a second hook hole respectively, and one end of the biasing member is hooked in the first hook hole while another end of the biasing member is hooked in the second hook hole respectively. The first hook hole and the locking member 51*c* are arranged on opposite sides of the first slot 23*c*. The first and the second hook holes are arranged on opposite sides of the first slot 23*c*.

In view of the foregoing, when the tightening mechanism 40, 40*b*, and 40*c* is in the tightening position and the locking member 51, 51*a*, 51*b*, and 51*c* is in the locking position, the locking member 51, 51*a*, 51*b*, and 51*c* is unmoved and the tightening mechanism 40, 40*b*, and 40*c* is restrained by the locking member 51, 51*a*, 51*b*, and 51*c* to keep in the tightening position. When the locking member 51, 51*a*, 51*b* and 51*c* is in the unlocking position, the tightening mechanism 40, 40*b*, and 40*c* is movable to the tightening and untightening positions Although specific embodiments have been illustrated and described, numerous modifications and variations are still possible without departing from the scope of the invention. The scope of the invention is limited by the accompanying claims.

The invention claimed is:

1. A scraper tool comprising:

a first clamping part provided with a first clamping portion and a first connecting portion and including a first slot arranged between the first clamping and the first connecting portions;

a second clamping part provided with a second clamping portion and a second connecting portion and including a second slot arranged between the second clamping and the second connecting portions, wherein the second connecting portion is connected to the first connecting portion;

a tightening mechanism provided with a slidable portion slidably engaged in the first and the second slots to movably connect to the first and the second clamping parts, wherein the tightening mechanism is movable to a tightening position in which the first and the second clamping parts are close to one another for tightly holding a blade therebetween and an untightening position in which the first and the second clamping parts are apart from one another for allowing the blade to be dissembled therefrom; and a locking mechanism including a locking member selectively restraining the tightening mechanism movably connected to the first clamping part, wherein the locking member is movable to a locking position and an unlocking position, wherein when the tightening mechanism is in the tightening position and the locking member is in the locking position, the locking member is unmoved and the tightening mechanism is restrained by the locking member to keep in the tightening position, and wherein when the locking member is in the unlocking position, the tightening mechanism is movable to the tightening and untightening positions;

wherein the first slot is provided with one end adjacent to the first clamping portion and another end adjacent to the first connecting portion, wherein the second slot is provided with one end adjacent to the second clamping portion and another end adjacent to the second connecting portion, and wherein the first clamping part is provided with a chute and the locking member is provided with a connecting portion movably engaged in the chute to movably connect to the first clamping part.

2. The scraper tool as claimed in claim 1, wherein the locking mechanism includes a biasing member held between the locking member and the first clamping part biasing the locking member to the locking position.

3. The scraper tool as claimed in claim 1, wherein the locking mechanism includes a control handle connected to the connecting portion of the locking member configured for a user to control the locking member, and wherein the control handle is mounted on the first clamping part and arranged outside a space between the first and the second clamping parts.

4. The scraper tool as claimed in claim 1, wherein the first clamping part is provided with a first side adjacent to the second clamping part and a second side opposite the first side, wherein the first clamping part defines a first surface on the second side, wherein the first connecting portion defines a through hole and the second connecting portion is provided with a flexible portion and a hooking portion, and wherein the flexible portion is arranged in the through hole and the hooking portion passes through the through hole and is hooked onto the first surface upon connection of the first and the second connecting portions.

5. The scraper tool as claimed in claim 4, wherein the second clamping part is provided with a first side adjacent to and facing the first side of the clamping part and a second side opposite the first side, wherein the second clamping part defines a second surface on the second side, wherein the tightening mechanism includes the slidable portion forming a slidable member, wherein the tightening mechanism includes a securing member engaged with one end of the slidable member configured for preventing the slidable member disengaging from the first and the second slots and a control handle protruding from another end of the slidable member configured for allow a user to control the tightening mechanism, wherein the securing member is provided with a fastening portion engaged with the slidable member and a pressing portion, wherein the pressing portion and the first surface include a first gasket disposed therebetween, wherein an end of the control handle and second surface include a second gasket disposed therebetween, wherein the-first gasket is provided with a first abutting portion abutting against the first surface and the second gasket is provided with a second abutting portion abutting against the second surface respectively, wherein the fastening portion is inserted through the first gasket and the first slot, wherein the slidable member is inserted through the second gasket and the second slot, and wherein the control handle is provided with an activating portion on which a user's finger is adapted to press.

6. The scraper tool as claimed in claim 5, wherein the securing member and the slidable member are in thread engagement.

7. The scraper tool as claimed in claim 1, wherein a longitudinal direction of the chute is transverse to a longitudinal direction of either the first or the second slots, wherein the locking member moving between the locking and the unlocking positions is of a moving track extending along the longitudinal direction of the chute, and wherein the tightening mechanism moving between the tightening and the untightening positions is of a moving track extending along the first and the second slots.

8. A scraper tool comprising:

a first clamping part provided with a first clamping portion and a first connecting portion and including a first slot arranged between the first clamping and the first connecting portions;

a second clamping part provided with a second clamping portion and a second connecting portion and including a second slot arranged between the second clamping and the second connecting portions, wherein the second connecting portion is connected to the first connecting portion;

a tightening mechanism provided with a slidable portion slidably engaged in the first and the second slots to movably connect to the first and the second clamping parts, wherein the tightening mechanism is movable to a tightening position in which the first and the second clamping parts are close to one another for tightly holding a blade therebetween and an untightening position in which the first and the second clamping parts are apart from one another for allowing the blade to be dissembled therefrom; and a locking mechanism including a locking member selectively restraining the tightening mechanism movably connected to the first clamping part, wherein the locking member is movable to a locking position and an unlocking position, wherein when the tightening mechanism is in the tightening position and the locking member is in the locking position, the locking member is unmoved and the tightening mechanism is restrained by the locking member to keep in the tightening position, and wherein when the locking member is in the unlocking position, the tightening mechanism is movable to the tightening and untightening positions;

wherein the locking member is provided with a stopping portion selectively stopping the tightening mechanism facing the first clamping portion, wherein the tightening mechanism includes a limit member provided with a limiting portion selectively contacting with the stopping portion and a guided portion, wherein the limiting portion and the stopping portion face oppositely, wherein when the locking member is in the locking position and the tightening mechanism is in the tightening position, the limiting portion abuts against the stopping portion to allow the tightening mechanism to keep in the tightening position, and wherein when the tightening mechanism is in transition from the untightening to the tightening positions, the guided portion of the limit member is adapted to push the locking member toward its unlocking position.

9. The scraper tool as claimed in claim 8, wherein the locking mechanism includes a biasing member held between the locking member and the first clamping part biasing the locking member to the locking position, wherein the first clamping part defines a first hook hole and the locking member defines a second hook hole respectively, and one end of the biasing member is hooked in first hook hole while another end of the biasing member is hooked in second hook hole respectively, wherein the first hook hole and the locking member are arranged on opposite sides of the first slot, and wherein the first and the second hook holes are arranged on opposite sides of the first slot.

10. The scraper tool as claimed in claim 8, wherein the guided portion forms an inclined surface.

11. A scraper tool comprising:

a first clamping part provided with a first clamping portion and a first connecting portion and including a first slot arranged between the first clamping and the first connecting portions;

a second clamping part provided with a second clamping portion and a second connecting portion and including a second slot arranged between the second clamping and the second connecting portions, wherein the second connecting portion is connected to the first connecting portion;

a tightening mechanism provided with a slidable portion slidably engaged in the first and the second slots to movably connect to the first and the second clamping parts, wherein the tightening mechanism is movable to a tightening position in which the first and the second clamping parts are close to one another for tightly holding a blade therebetween and an untightening position in which the first and the second clamping parts are apart from one another for allowing the blade to be dissembled therefrom; and a locking mechanism including a locking member selectively restraining the tightening mechanism movably connected to the first clamping part, wherein the locking member is movable to a locking position and an unlocking position, wherein when the tightening mechanism is in the tightening position and the locking member is in the locking position, the locking member is unmoved and the tightening mechanism is restrained by the locking member to keep in the tightening position, and wherein when the locking member is in the unlocking position, the tightening mechanism is movable to the tightening and untightening positions;

wherein the tightening mechanism includes a limit member provided with a first retaining portion and the locking member is provided with a second retaining portion selectively engaged with and disengaged from the first retaining portion, wherein the tightening mechanism is provided with a first guided portion and the locking member is provided with a second guided portion selectively engaged with and disengaged from the first guided portion, wherein the first and the second retaining portion are toothed, wherein when the locking member is in the locking position and the tightening mechanism is in the tightening position, the first and the second retaining portions engage with each other to allow the tightening mechanism to keep in the tightening position, and wherein when the tightening mechanism is in transition from the untightening to the tightening positions, the first guided portion is adapted to push the second guided portion to guide the locking member toward the unlocking position.

12. The scraper tool as claimed in claim 11, wherein the locking mechanism includes a biasing member held between the locking member and the first clamping part biasing the locking member to the locking position, wherein the first clamping part defines a first hook hole and the locking member defines a second hook hole respectively, and one end of the biasing member is hooked in first hook hole while another end of the biasing member is hooked in second hook hole respectively, and wherein the first hook hole and the locking member are arranged on opposite sides of the first slot, and wherein the first and the second hook holes are arranged on opposite sides of the first slot.

13. The scraper tool as claimed in claim 11, wherein the first and the second guided portions form an inclined surface.

14. A scraper tool comprising:

a first clamping part provided with a first clamping portion and a first connecting portion and including a first slot arranged between the first clamping and the first connecting portions;

a second clamping part provided with a second clamping portion and a second connecting portion and including a second slot arranged between the second clamping and the second connecting portions, wherein the second connecting portion is connected to the first connecting portion;

a tightening mechanism provided with a slidable portion slidably engaged in the first and the second slots to movably connect to the first and the second clamping parts, wherein the tightening mechanism is movable to a tightening position in which the first and the second clamping parts are close to one another for tightly holding a blade therebetween and an untightening position in which the first and the second clamping parts are apart from one another for allowing the blade to be dissembled therefrom; and a locking mechanism including a locking member selectively restraining the tightening mechanism movably connected to the first clamping part, wherein the locking member is movable to a locking position and an unlocking position, wherein when the tightening mechanism is in the tightening position and the locking member is in the locking position, the locking member is unmoved and the tightening mechanism is restrained by the locking member to keep in the tightening position, and wherein when the locking member is in the unlocking position, the tightening mechanism is movable to the tightening and untightening positions;

wherein the locking member is provided with a stopping portion selectively stopping the tightening mechanism facing the first clamping portion and a guided portion opposite the stopping portion, wherein when the locking member is in the locking position and the tightening mechanism is in the tightening position, the slidable portion abuts against the stopping portion to allow the tightening mechanism to keep in the tightening position, and wherein when the tightening mechanism is in transition from the untightening to the tightening positions, the slidable portion is adapted to push the guided portion to guide the locking member toward its unlocking position; and wherein the locking mechanism includes a biasing member held between the locking member and the first clamping part biasing the locking member to the locking position, wherein the first clamping part defines a receptacle and one end of the biasing member is arranged in the receptacle, and wherein the locking member is provided with a mounting portion and another end of the biasing member capped on the mounting portion.

15. A scraper tool comprising:

a first clamping part provided with a first clamping portion and a first connecting portion and including a first slot arranged between the first clamping and the first connecting portions;

a second clamping part provided with a second clamping portion and a second connecting portion and including a second slot arranged between the second clamping and the second connecting portions, wherein the second connecting portion is connected to the first connecting portion;

a tightening mechanism provided with a slidable portion slidably engaged in the first and the second slots to movably connect to the first and the second clamping parts, wherein the tightening mechanism is movable to a tightening position in which the first and the second clamping parts are close to one another for tightly holding a blade therebetween and an untightening position in which the first and the second clamping parts are apart from one another for allowing the blade to be dissembled therefrom; and a locking mechanism including a locking member selectively restraining the tightening mechanism movably connected to the first clamping part, wherein the locking member is movable to a locking position and an unlocking position, wherein when the tightening mechanism is in the tightening position and the locking member is in the locking position, the locking member is unmoved and the tightening mechanism is restrained by the locking member to keep in the tightening position, and wherein when the locking member is in the unlocking position, the tightening mechanism is movable to the tightening and untightening positions;

wherein the locking member is provided with a stopping portion selectively stopping the tightening mechanism facing the first clamping portion and a guided portion opposite the stopping portion, wherein when the locking member is in the locking position and the tightening mechanism is in the tightening position, the slidable portion abuts against the stopping portion to allow the tightening mechanism to keep in the tightening position, and wherein when the tightening mechanism is in transition from the untightening to the tightening positions, the slidable portion is adapted to push the guided portion to guide the locking member toward its unlocking position; and wherein the locking mechanism includes a biasing member held between the locking member and the first clamping part biasing the locking member to the locking position, wherein the first clamping part defines a first hook hole and the locking member defines a second hook hole respectively, and one end of the biasing member is hooked in the first hook hole while another end of the biasing member is hooked in the second hook hole respectively, wherein the first hook hole and the locking member are arranged on opposite sides of the first slot, and wherein the first and the second hook holes are arranged on opposite sides of the first slot.

* * * * *